(12) United States Patent
Kotcheff et al.

(10) Patent No.: US 7,165,080 B2
(45) Date of Patent: Jan. 16, 2007

(54) METHOD AND APPARATUS FOR FACILITATING REFINEMENT OF A SEARCH

(75) Inventors: Aaron Kotcheff, London (GB); Tony Rose, Godalming (GB)

(73) Assignee: Canon Kabushiki Kaisha, Tokyo (JP)

(*) Notice: Subject to any disclaimer, the term of this patent is extended or adjusted under 35 U.S.C. 154(b) by 262 days.

(21) Appl. No.: 09/984,088

(22) Filed: Oct. 26, 2001

(65) Prior Publication Data

US 2002/0087535 A1 Jul. 4, 2002

(30) Foreign Application Priority Data

Oct. 27, 2000 (GB) .................................. 0026353.3

(51) Int. Cl.
*G06F 17/30* (2006.01)
(52) U.S. Cl. .................... 707/203; 707/7; 707/100; 715/513
(58) Field of Classification Search ............ 707/1–10, 707/100–104.1, 200–205
See application file for complete search history.

(56) References Cited

U.S. PATENT DOCUMENTS

| | | | |
|---|---|---|---|
| 5,404,506 A | 4/1995 | Fujisawa et al. | |
| 5,454,106 A | 9/1995 | Burns et al. | |
| 5,873,080 A | 2/1999 | Coden et al. ................... 707/3 |
| 5,970,499 A * | 10/1999 | Smith et al. ............. 707/104.1 |
| 6,070,158 A | 5/2000 | Kirsch et al. ................... 707/3 |
| 6,144,958 A * | 11/2000 | Ortega et al. ................... 707/5 |
| 6,493,702 B1 * | 12/2002 | Adar et al. ..................... 707/3 |
| 6,629,097 B1 * | 9/2003 | Keith ............................ 707/5 |
| 2002/0107853 A1 * | 8/2002 | Hofmann et al. .............. 707/7 |

FOREIGN PATENT DOCUMENTS

| | | |
|---|---|---|
| EP | 0 737 928 A1 | 10/1996 |
| EP | 0 860 786 | 8/1998 |
| EP | 0 992 919 A1 | 4/2000 |
| EP | 1 033 663 A2 | 9/2000 |
| EP | 1 045 314 A2 | 10/2000 |
| EP | 1 050 830 | 11/2000 |
| GB | 2 269 923 A | 2/1994 |
| JP | 2000-250841 | 9/2000 |
| WO | 96/03702 | 2/1996 |
| WO | 97/45800 | 12/1997 |
| WO | 99/12106 | 3/1999 |

OTHER PUBLICATIONS

D. Elsworthy, et al., "*A Natural Language System for Information Retrieval*," Natural Language Engineering 1(1):000-000 (1998) Cambridge University Press, pp. 1-23.

Sougata Mukherjea, Kyoji Hirata and Yoshinori Hara. "Using Clustering and Visualization for Refining the Results of a WWW Image Search Engine", pp. 29-35, Nov. 3, 1988.

* cited by examiner

*Primary Examiner*—Mohammad Ali
(74) *Attorney, Agent, or Firm*—Fitzpatrick, Cella, Harper & Scinto

(57) ABSTRACT

A receiver receives from a search engine search results consisting of at least one search item associated with at least one context item relating to the search item. A modifier modifies the search results by associating at least one context item with data for enabling the user to cause the search results to be filtered in accordance with that context item by selecting that context item. A supplier supplies the modified search results to the user.

3 Claims, 14 Drawing Sheets

80

Filter: mountain = against a blue sky 24 images found.

Show As Images — 83

24 images have further context.

| Matched Word — 66 | Context — 67 | Images — 68 |
|---|---|---|
| mountain | above a lake | ☐☐ — 69 |
| | huge | ☐☐☐ |
| | rocky | ☐☐☐☐☐☐☐ |
| | snowy | ☐☐☐☐☐☐☐☐☐☐☐☐ |
| | volcanic | ☐ |
| | with climber | ☐☐ |
| | with person | ☐☐☐ |
| | with skier | ☐ |
| | with skiiers | ☐ |
| | with trees | ☐☐☐☐☐ |
| | with waterfall | ☐ |

FIG. 15

```
                               ┌─ 90
Filter: mountain = against a blue sky, snowy 17 images found.

┌─────────────────┐ ┌─ 83
│ Show As Images  │
└─────────────────┘

6 images have further context.

Matched ─ 66      ─ 67                    ─ 68
 Word     Context          Images
                                             ─ 69
mountain   above a lake    □□ huge            □□□ volcanic        □ with climber    □□ with person     □□□ with skier      □ with skiers     □ with trees      □□□□□
```

FIG. 16

```
                               ┌─ 95
Filter: mountain = against a blue sky, snowy, with trees 1 image found.

┌─────────────────┐ ┌─ 83
│ Show As Images  │
└─────────────────┘

1 image has further context.

Matched ─ 66      ─ 67                    ─ 68
 Word     Context          Images
                                    ─ 69
mountain   above a lake    □
```

FIG. 17

METHOD AND APPARATUS FOR FACILITATING REFINEMENT OF A SEARCH

BACKGROUND OF THE INVENTION

1. Field of the Invention

This invention relates to apparatus and a method for facilitating searching, in particular to apparatus and a method for providing an interface that enables a user to refine the results of a search.

2. Description of Related Art

Most information retrieval systems such as web-based search engines that enable retrieval over the Internet are quite good at finding information but poor at presenting the results to the user. Typically, the results are presented as a simple list of documents or document headers with hyperlink connections to the URLs at which the actual documents can be found. Sometimes, the results lists will also include a relevance score for each document and the documents may be ordered by their relevance scores. A few web-based search engines attempt to improve on this by, for example, grouping pages from the same site together. It is, however, difficult for users to make effective use of such a list of documents because the list does not show how the documents are related to one another or to the original search query.

Our co-pending EP-A-1033662 (corresponding to U.S. application Ser. No. 09/511,447) describes a natural language search method and apparatus that enables the results of a search to be presented in context so that a user can understand the results of the search more easily.

SUMMARY OF THE INVENTION

It is an aim of the present invention to provide apparatus and a method for presenting the results of a search to a user that provides the search results in context and, in addition, assists the user in further refining the search.

In one aspect the present invention provides apparatus for presenting a user with search results, wherein the apparatus comprises means for receiving from searching apparatus search results including contextual information for each search result,
means for presenting the search results to the user;
means for instructing the search engine to conduct a further search when a user selects contextual information associated with a search result; and
means for presenting the results of the further search to the user.

In an embodiment, the present invention provides a user interface to the searching apparatus described in EP-A-1033662 (corresponding to U.S. application Ser. No. 09/511,447, the whole contents of which are hereby incorporated by reference).

In an embodiment, each search result is associated with at least one set of contextual information and each set of contextual information is associated with data for enabling refinement of the search results so as to include only the search results having that contextual information when the user selects that contextual information.

In an embodiment, the apparatus may be arranged to instruct the searching apparatus to carry out a refined search on the basis of the selected contextual information. In another embodiment, the apparatus may be arranged to filter the results of a search carried out by the searching apparatus in accordance with the contextual information.

Embodiments of the present invention will now be described, by way of example, with reference to the accompanying drawings, in which:

BRIEF DESCRIPTION OF THE DRAWINGS

FIG. 15 shows an example of a screen that may be displayed to a user showing the results of a search filtered in accordance with context information;

FIG. 16 shows an example of a screen that may displayed to a user to show the search results shown in FIG. 15 further refined in accordance with further context information; and FIG. 17 shows the screen that may be displayed to a user to show the search results shown in FIG. 16 further refined by further context information.

DETAILED DESCRIPTION

Figure 1:
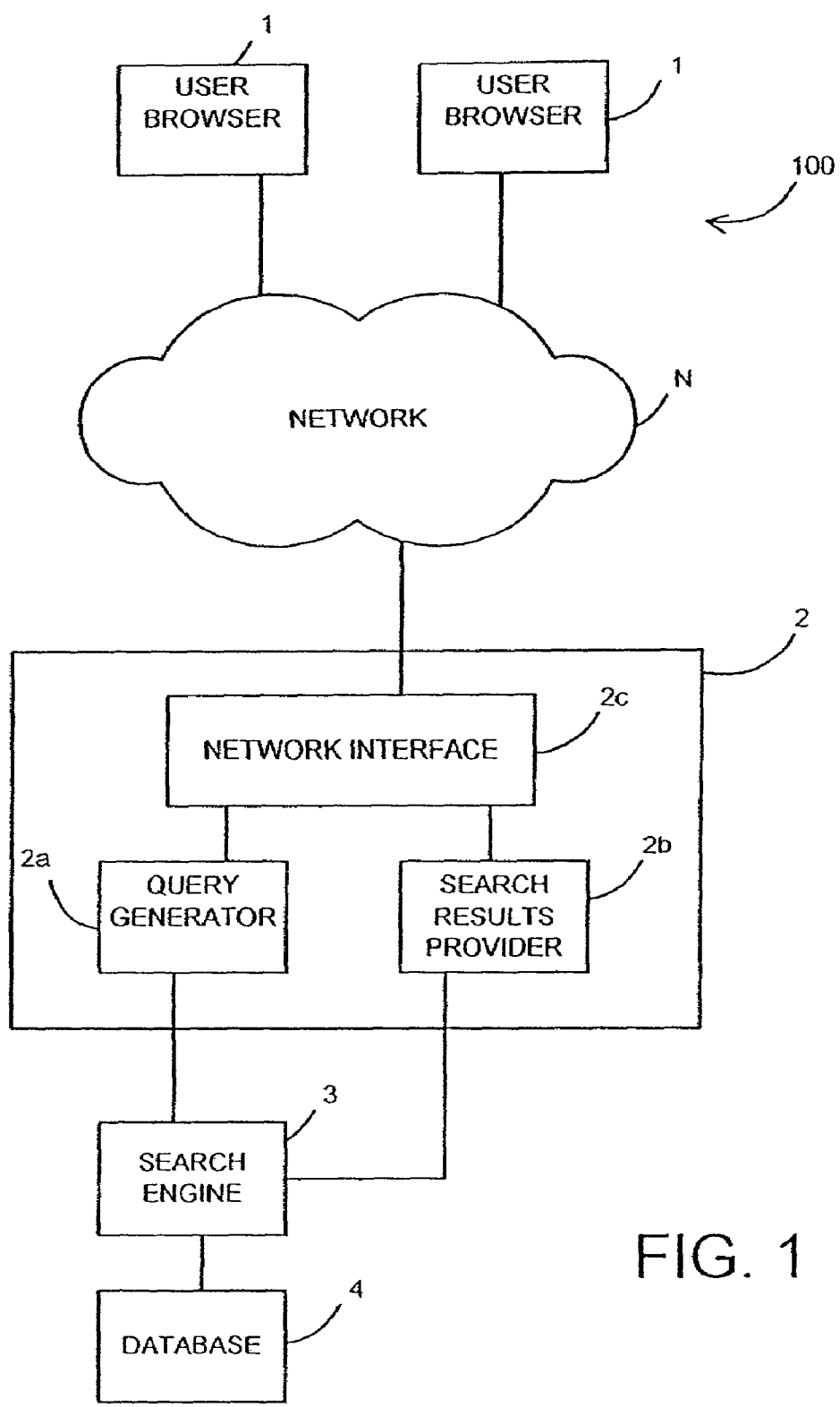
FIG. 1 shows a functional block diagram of a network system for enabling a user to conduct a search.

Referring now to the drawings, FIG. 1 shows by way of a block diagram a system 100 in which one or more user browsers 1 (two are shown although there may be only one or many more) are coupled via a network N and a search interface apparatus 2 to a search engine 3 which is itself coupled to a database 4.

The network N may be the Internet or an Intranet or may be a local area network (LAN) or wide area network (WAN) and the user browsers 1, search interface apparatus 2, search engine 3 and database 4 may be physically located within the same or different buildings. In this regard, it will be appreciated that the search engine 3 may be connected to the search interface apparatus 2 via the network N or a different network and that, similarly, the database store may be directly connected to the search engine 3 or may be connected to the search engine 3 via the network N or a different network. It will, of course, be understood that, as used herein, the word "network" does not necessarily imply the use of any known or standard networking system or protocol and that the network N may be any arrangement which enables communication between the user browser and the search interface apparatus.

Figure 2:
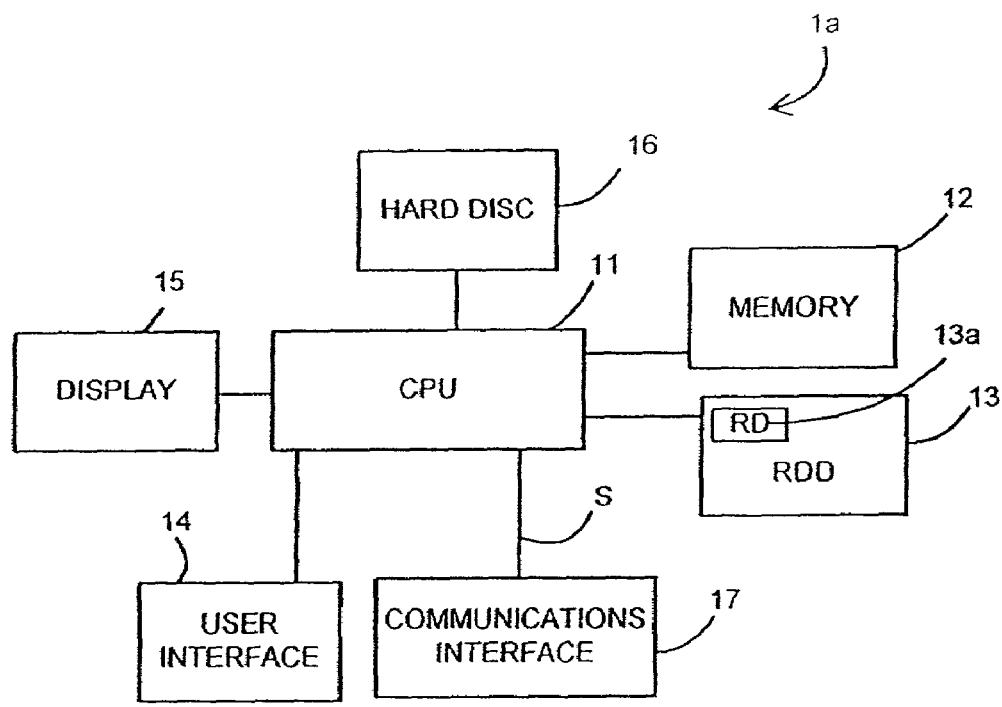
FIG. 2 shows a block diagram of a computer system suitable for forming a user browser shown in FIG. 1.

FIG. 2 shows a block diagram of a typical computer system 1a that may form a user browser 1. The computer system may be, for example, a personal computer, a portable computer or work station or the like and comprises a central processor unit (CPU) 11 with associated memory (ROM and/or RAM) 12, a hard disk drive 16, a removable disk drive (RDD) 13 for receiving a removable storage medium or disk (RD) 13a, a display 15 for displaying information to a user, a user interface 14 such as a keyboard and/or pointing device such as a mouse for enabling a user to input instructions to the CPU 11, and a communications interface 17 for enabling communication over the network N.

Figure 3:
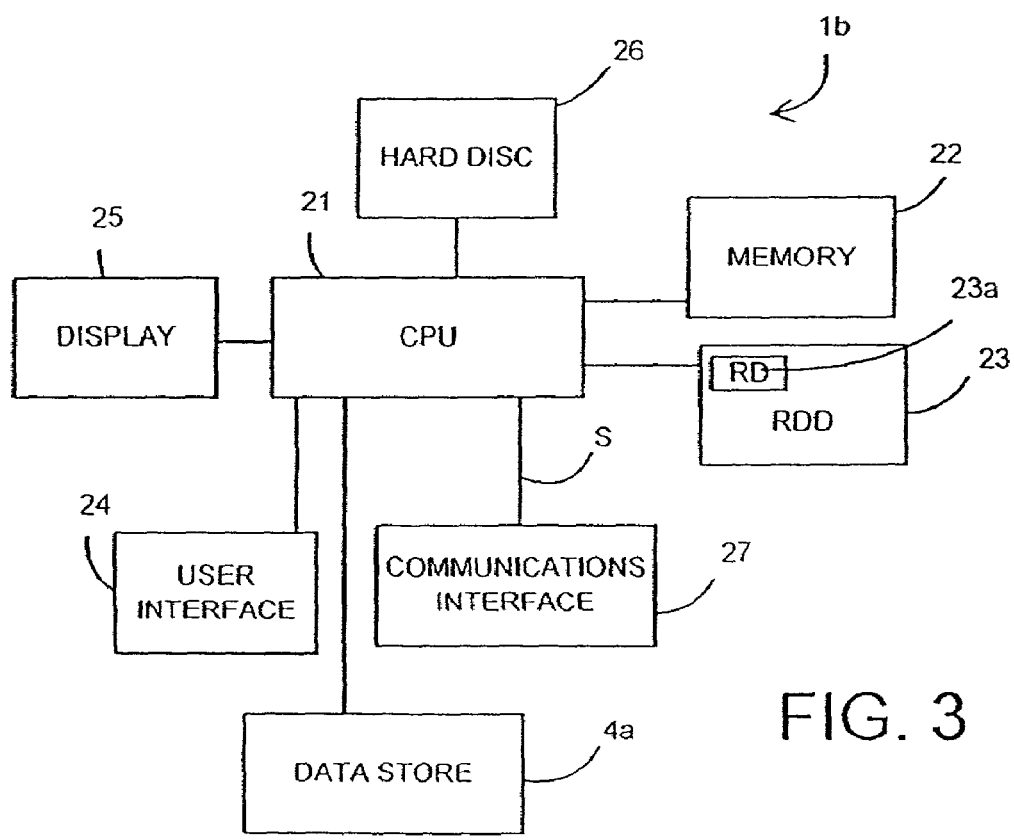
FIG. 3 shows a block diagram of a computer system suitable for forming a search interface apparatus 2 or search engine 3 shown in FIG. 1.

FIG. 3 shows a block diagram of a computer system 1b suitable for forming a search system comprising the search interface apparatus 2, the search engine 3 and the database 4. As shown, the computer system comprises a CPU 21 having associated memory (ROM and/or RAM) 22, a hard disk drive 26, a communications interface 27 for communicating with user browsers 1 over the network N and a data store 4a for providing the database 4. As shown in FIG. 3, the computer system may also have a user interface 24 and display 25 for enabling a systems operator to communicate with the CPU 21 to, for example, to configure the computer system to provide the searching system. The computer system 21 may also include a removable disk disk drive (RDD) 23 for receiving a removable disk (RD) 23a for enabling data and/or processor implementable instructions to be downloaded from a removable disk such as, for example, a floppy disk or optical storage medium such as a CD ROM, DVD disk or the like. The computer system shown in FIG. 3 may also be configurable by processor implementable instructions and/or data supplied as a signal S via, for example, communications interface 27 from another computer system.

The computer system shown in FIG. 3 may thus be programmed or configured to provide the searching system shown in FIG. 1 by program instructions and/or data supplied in at least one of two ways;
1. as a signal S supplied over the network N; and
2. carried by a removable disk or data storage medium (RD).

Program instructions and data will, of course, be stored on the hard disk drive 26 and/or in the memory 22 in known manner.

The computer system 1a shown in FIG. 2 is configured as a user browser by conventional program instructions which may be supplied on a removable storage medium and/or as a signal over the communications interface 17. Typically a user browser 1 may be configured to implement the Netscape web browser or Microsoft Internet Explorer web browser.

Figure 4:
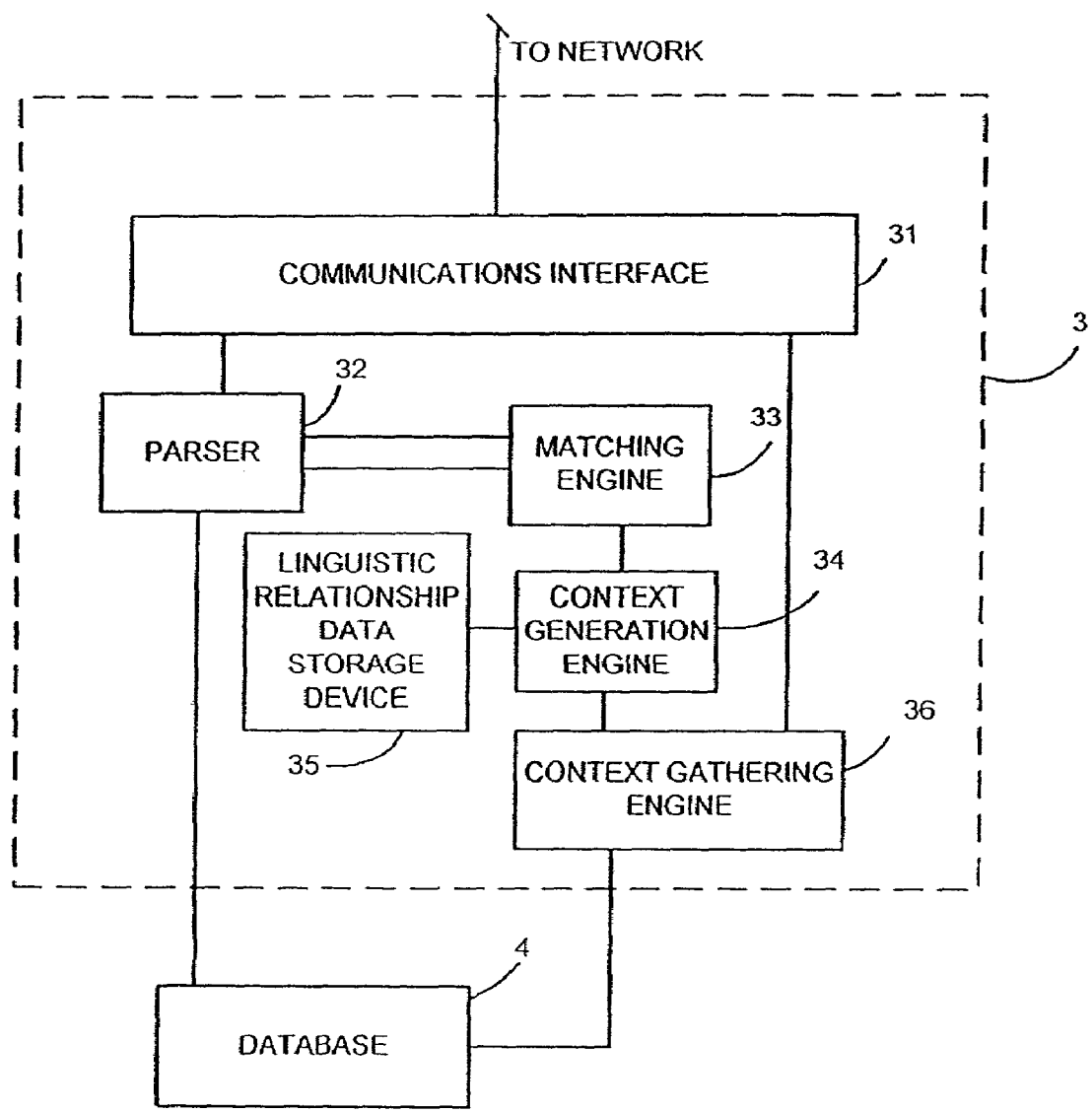
FIG. 4 shows a functional block diagram of the search engine shown in FIG. 1.

FIG. 4 shows a block diagram for illustrating the functional components of the search engine 3 provided by the computer system shown in FIG. 3 when programmed by processor implementable instructions. The search engine 3 has the same functional components as the search engine shown in FIG. 1 of EP-A-1033662 (corresponding to U.S. application Ser. No. 09/511,447 the whole contents of which are hereby incorporated by reference) with exception that the interface 1 shown in FIG. 1 of EP-A-1033662 is replaced by the communications interface 31 which is arranged to receive, over the network N, input search queries from a user browser 1 and to provide, over the network N, search results to a user browser 1.

A parser 32 is coupled to the communications interface 31 and to the database 4 so as to parse input search queries and information from the database 4 to generate semantic and syntactic information. As set out in EP-A-1033662, the parser may be of any form. For example, the parser may be a dependency parser which parses natural language to generate meaning data which comprises meaning representations for words and links indicating which meaning representation modifies another meaning representation. Examples of dependency parsers are disclosed in GB-A-2269923, EP-A-0737928, a paper by T Järvinen and P Tapanainen entitled "A Dependency Parser for English" (Technical Report No. TR-1, Department of General Linguistics, University of Helsinki, March 1997), and a paper by P Tapanainen and T Järvinen entitled "A Non-Projective Dependency Parser" (Proceedings of the 5th Conference on Applied Natural Language Processing, Washington D.C., April 1997, Association for Computational Linguistics). As another possibility, the finite state parser implementing a dependency parser technique described in the applicants co-pending application EP-A-1033663 (corresponding to U.S. application Ser. No. 09/511,385 the whole contents of which are hereby incorporated by reference) may be used.

The parser 32 is thus arranged to generate two sets of parsed data which are passed to a matching engine 33 which performs matching using both semantic and syntactic information from the parser 32. Matching to provide a full set of semantic relationships between words is described in the applicants co-pending EP-A-0992919 (corresponding to U.S. application Ser. No. 09/400,872 the whole contents of which are hereby incorporated by reference).

A context generation engine 34 is coupled to the matching engine 33 to generate context data for the matched data in accordance with linguistic relationship data stored in a linguistic relationship data storage device 35. The output of the context generation engine 34 is supplied to a context gathering engine 36 which is arranged to receive the context data from the context generation engine 34 and to pass the search results and context data to the communications interface 31 for supply to the browser 1 of the user who requested the search over the network N.

The carrying out of a search on the system 100 shown in FIG. 1 will now be described in overview with reference to FIGS. 5 to 8.

In order to initiate a search, a user connects to his Internet service provider in usual manner and then enters the appropriate URL to enable connection to the web server providing the searching interface apparatus 2 via the network N. When a log on request is received via a network interface 2c of the web server 2 from a user browser 1 at step S1 in FIG. 5 the web server 2 forwards, at step S2 in FIG. 5, a search query entry page to the user browser 1 over the network N to cause a search query entry screen to be displayed on the display 15 of the user browser 1.

Figure 6:
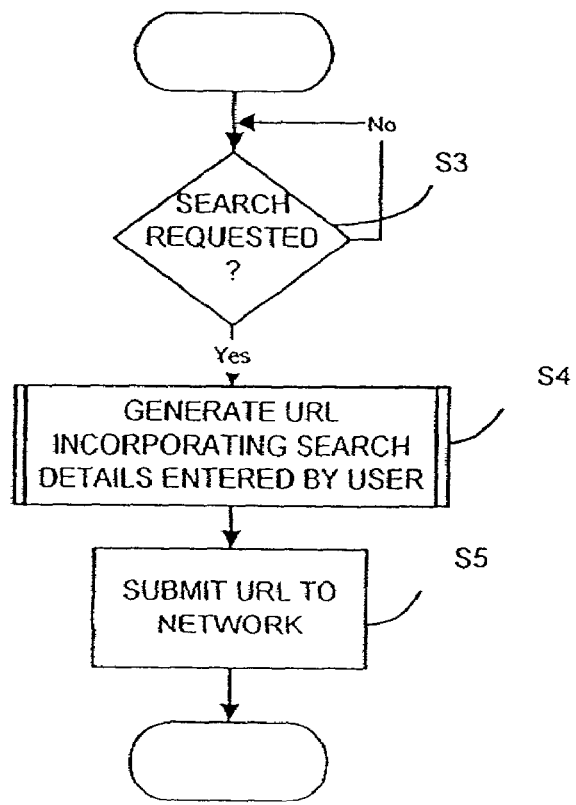

FIG. 6 shows the steps that are then carried out by the user browser 1. Thus, when at step S3 in FIG. 6 the user browser 1 determines that the user has entered a search request in the search query entry screen, then, at step S4, the user browser generates, in conventional manner, a URL consisting of the URL of the web server 2 and incorporating the search details entered by the user at step S4 and then at step S5 submits the URL to the network N. Communication over the network is, in this embodiment, in accordance with standard Internet protocols and the search query provided by the user browser 1 is formulated in HTML (hypertext markup language). When at step S6 in FIG. 7a the web server 2 receives the URL incorporating the users search request, a search query generator 2a of the web server 2 extracts the search request from the URL and runs a CGI script to formulate the search query as an XML (extendable Markup Language) document for supply to the search engine 3 at step S7. The query generator 2a then forwards the search request as an XML document to the search engine at step S8 in FIG. 7a. In this example, the connection between the query generator 2a and the search engine 3 is via a TCP/IP socket.

When at step S9 in FIG. 7b, the web server 2 receives an XML document from the search engine 3 providing the results of the requested search, then at step S10, a search results provider 2b of the web server 2 processes the search results for supply to the user browser 1 at step S10 as will be described in greater detail below and then, at step S11, forwards the search results as an HTML (Hyper Text Markup Language) document to the user browser 1 over the network N.

Figure 8:
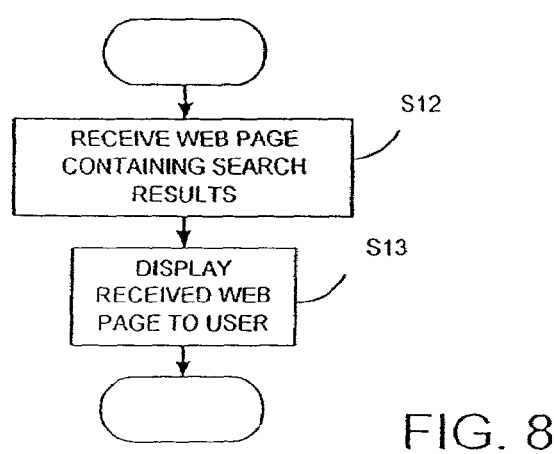

When at step S12 in FIG. 8, the user browser 1 receives, via the network N, a web page containing the search results, then, at step S13, the user browser 1 displays the received web page to the user showing the search results.

The searching procedure will now be described in detail for the case where the database to be searched is a database of images each associated with meta data defining a caption describing that image.

Figure 9:
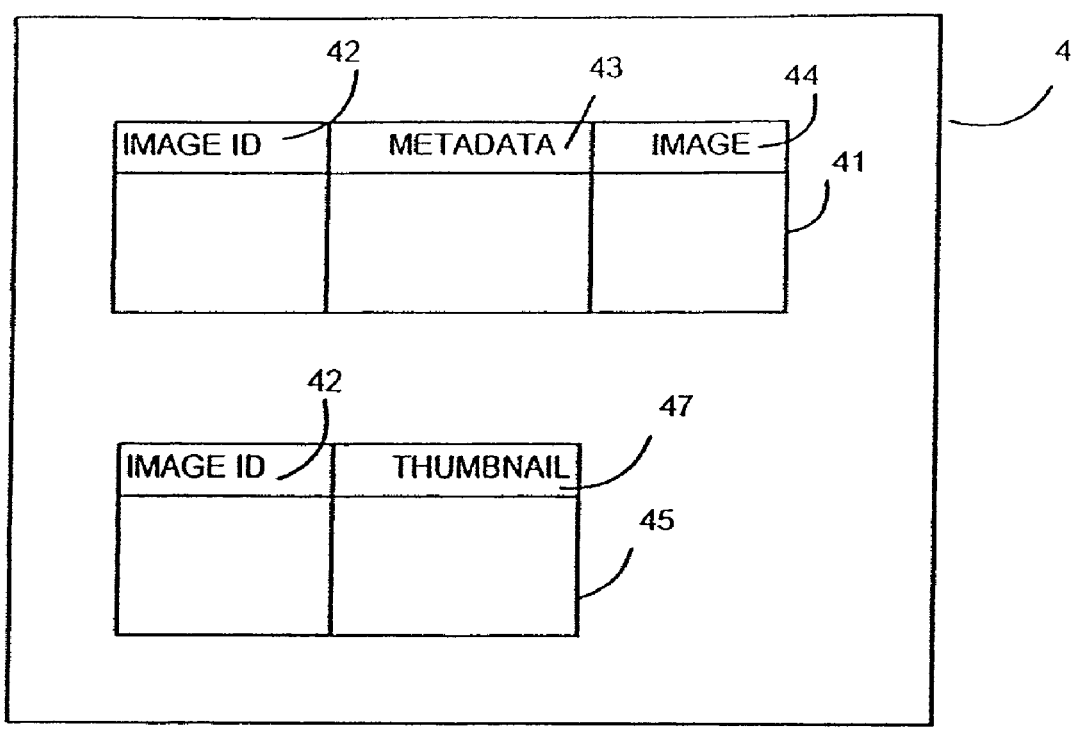
FIG. 9 shows a schematic block diagram for illustrating the contents of a database of the system shown in FIG. 1.

FIG. 9 shows very schematically the structure of the database. As shown, the database 4 comprises a first store 41 of database items in the form of images 44 each associated with an image ID 42 and meta data 43 defining the corresponding caption. As shown in FIG. 9, the database 4 also includes a second store 45 in which each image ID 42 is associated with a thumbnail image 47 of the corresponding image.

In order to submit a search query to the search engine 3 to search in the database 4, the user will initially log on to the web server in a conventional manner by inputting the URL of the web server 2. This URL will have the format:

http://xxxx.com where "xxxx.com" represents the address of the web server 2. It will be appreciated that "xxxx" is not intended to represent an actual website address.

Figure 5:
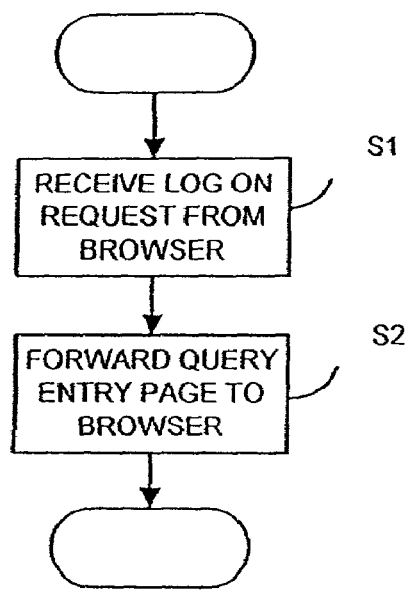
FIGS. 5 to 8 show flow charts for illustrating the carrying out of a search on the system shown in FIG. 1.
Figure 12:
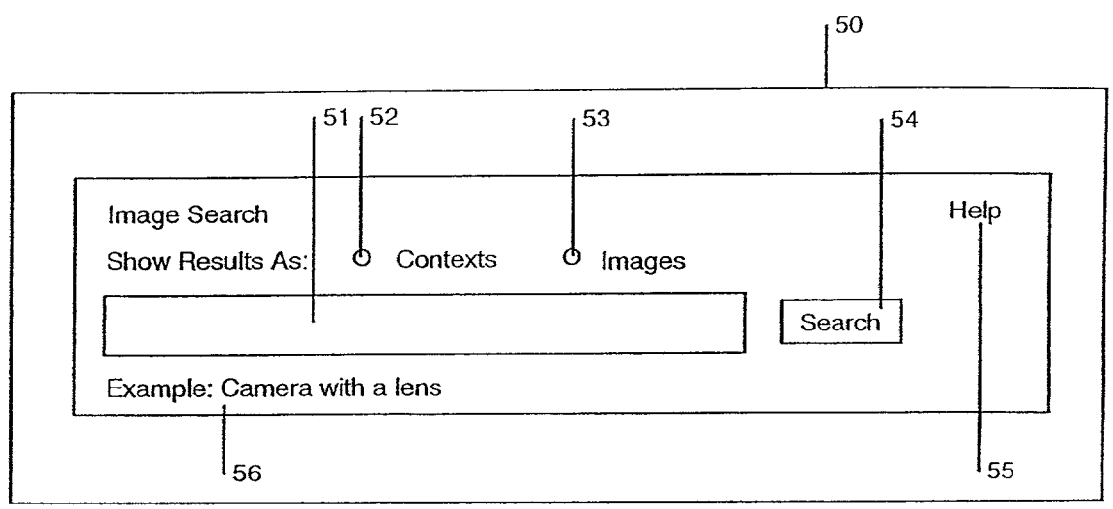
FIG. 12 shows an example of a search input screen that may be displayed to a user to enable a user to instruct a search.

As set out above with reference to FIG. 5, when a log on request is received from a user browser, the web server 2 forwards to the user browser a search query entry web page. FIG. 12 shows a screen 50 displaying an example of such a search query entry page. The screen 50 provides a window 51 into which a user can input a search query using the keyboard of the user interface 14. To assist the user, an example 56 ("camera with lens") of a possible search query is given below the window to show the search query format. The screen 50 also has radio buttons 51 and 52 for enabling a context mode and an images mode of search results presentation to be selected together with a help button 55 providing, in known manner, a hyperlink to on-line help and a search button 54 for initiating a search in accordance with the search query input to the window 51.

When the user browser 1 determines at step S3 in FIG. 6 that the user has clicked on the search button 54 to initiate the search, then at step S4 the user browser 1 generates from the web page in known manner a URL incorporating the search details entered by the user and specifying whether the user has selected the context or images mode of search result presentation by activating either the radio button 52 or the radio button 53.

To give an example, where the user enters as the search query "boats on the sea" and activates the images radio button 53, then the user browser 1 will generate the following URL:

http://xxxx.com?rtype=images&query=boats%20o
n%20the%20sea&type=image in which "xxxx.com" represents the base URL of the web server 2 and the form data after the base URL are a set of key/value pairs separated by "&" in conventional manner. The first key "rtype" indicates whether the radio button 52 or the radio button 53 has been selected with, in the above example, the radio button 53 selecting the images mode of results presentation having been selected. The second key "query" specifies the search query present in the window 51, in this case "boats+on+the+sea" (where the %20 sequences have been transformed into their character equivalents) and the final key "type" specifies the format of the results with the type being "image" when the radio button 53 is selected and the type being "context" when the radio button 52 is selected. As will be explained below, in this embodiment, a further results format consisting of a presentation of a single image is provided to enable a user to view on a larger scale an image selected from the images included in the search results.

Figure 10A:
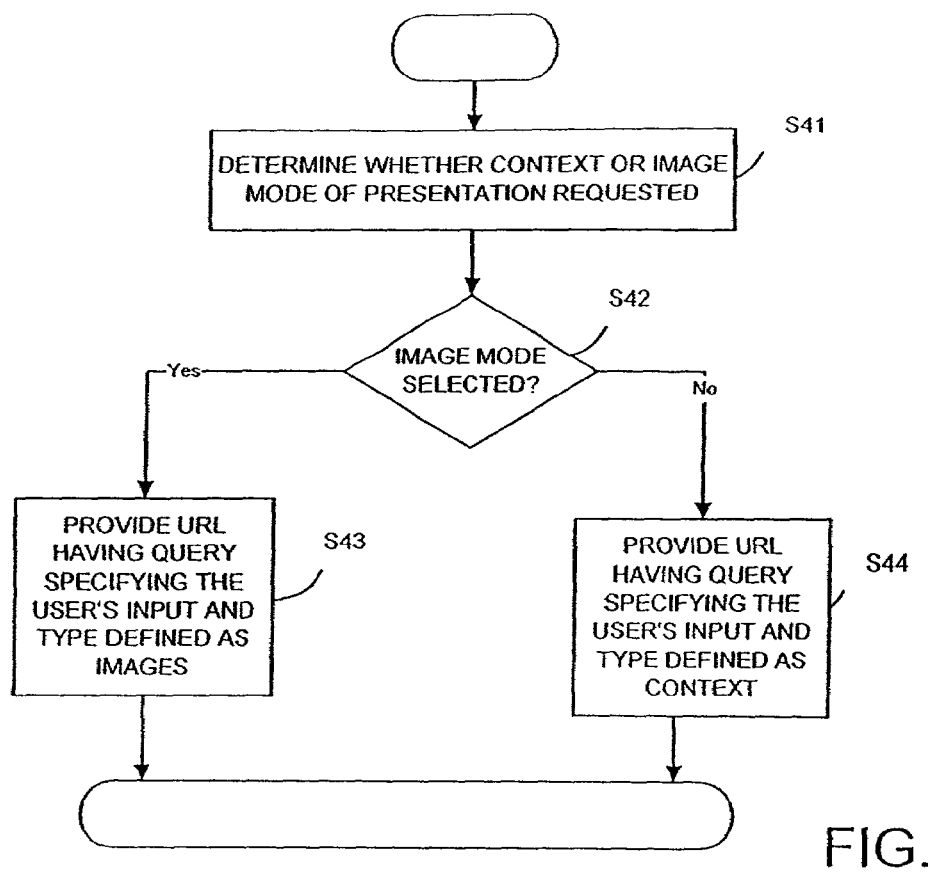
FIGS. 10a and 10b show flow charts for illustrating in greater detail steps carried out by search interface apparatus shown in FIG. 1 when a search is instructed by a user.

The step S4 in FIG. 6 of generating a URL incorporating the search details entered by a user will now be described in greater detail with reference to FIG. 10a for the case where the user enters the search query "mountains" in the window 51. Thus, at step S41, the browser 1 determines whether context or images mode of presentation of search results has been selected by checking whether the radio button 52 or the radio button 53 has been activated. If the radio button 53 is activated, then the answer at step S42 is yes and at step S43 the browser 1 generates a URL having a query key determined by the search query input by the user into the window 51 and a last key of type images. In this example, the URL would have the form:

http://xxxx.com?rtype=images&query=
mountains&type=image

If, however, the answer at step S42 is no, then at step S44 the browser 1 generates a URL having as the second key a query defined by the users search request in the window 51 and a last key of type context. Thus, in this case the URL would have the form:

http://xxxx.com?rtype=context&query=
mountains&type=context

The URL is then submitted to the network as described above with reference to step S5 of FIG. 6. After the web server 2 has received the URL from the user browser at step S6 in FIG. 7a, the query generator 2a decodes the URL and formats a search request in the form of an XML document by running a CGI script as described above. In this embodiment, the XML document will have the format:

```
<ce>
  <q> query </q>
</ce>
```

Thus in the particular example given above, the XML search query document will have the format:

```
<ce>
  <q> mountains </q>
</ce>
```

Figure 7A:
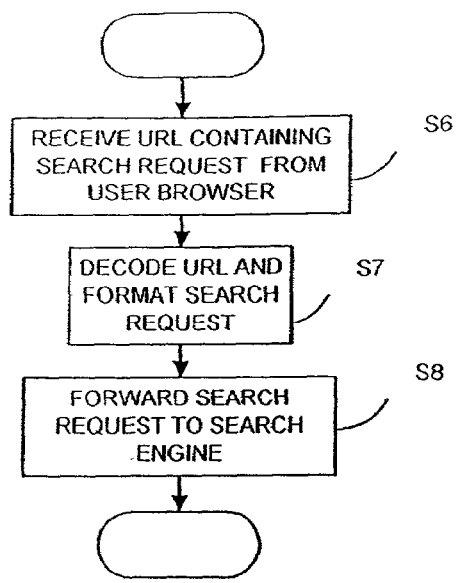

The XML search query document is then forwarded to the search engine 3 via the TCP/IP socket at step S8 in FIG. 7*a*.

The search engine 3 then conducts the search as described in EP-A-1033662 with reference to FIGS. 3 to 5 of EP-A-1033662. Thus, in brief, the parser 32 parses the input search query. Then for each set of caption or meta data in turn, the parser 32 parses the caption data, the matching engine 33 matches the parser search query to the parsed caption data and generates matched data. If there are any matched words, then the context generation engine 34 generates context data for that caption data by selecting the unmatched words in the caption data in turn and determining for each unmatched word whether the unmatched word is at the end of a path defined in the path rules. If the unmatched word is in a valid phrase, then the context generation engine 34 finds the smallest valid phrase containing the unmatched word, adds the phrase to memory referenced to the matched word and repeats this process until the context generation engine 34 has processed all of the unmatched words for the set of context data. Then the context gathering engine 36 carries out the steps set out in FIG. 5 of EP-A-1033662 to group the data accordingly and supplies to the communications interface 31 search results in which each search item or result matching the search request input into the window 51 by the user is listed together with its related context data.

It will, of course, be appreciated that, as set out in EP-A-1033662, the matching process (which is described in greater detail in EP-A-0992919) uses semantic broadening so that a matching word need not be the same word but could be a word having a similar meaning. For example, the word "boys" may be considered a good match for the word "children".

The search results are supplied via the search engine 3 to the search results provider 2*b* as an XML document having the format given below.

```
<body>
<cedis>
<c 1 12/img0021.jpg>snowy mountains above a lake.
<context>mountains=snowy</context>
<context>above=</context>
<context>lake=blue</context>
</c>
.....
.....
.....
</cedis>
</body>
```

For the sake of simplicity, only one search result is shown above with the ellipsis indicating that further search results will normally be included within the body of the document.

Each search result consists of an image ID for the thumbnail image corresponding to the image identified in the search followed by its corresponding caption or meta data, in this case:

```
<c 1 12/img0021.jpg>snowy mountains above a lake.
``` followed by a set of context data extracted by the search engine 3, in this case the context "snowy" for the word "mountains" and the context "blue" for the word "lake".

Figure 7B:
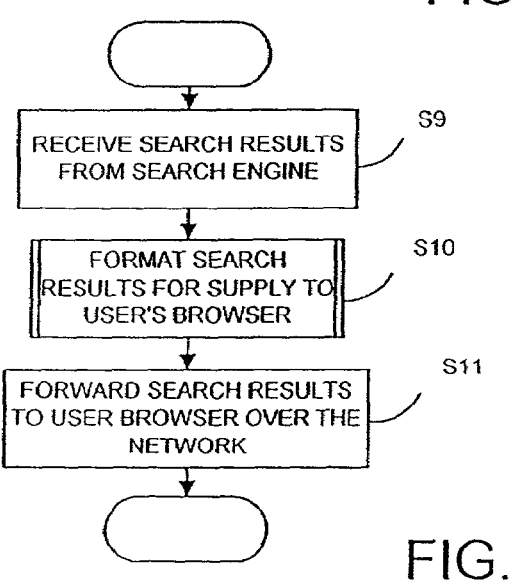
Figure 11A:
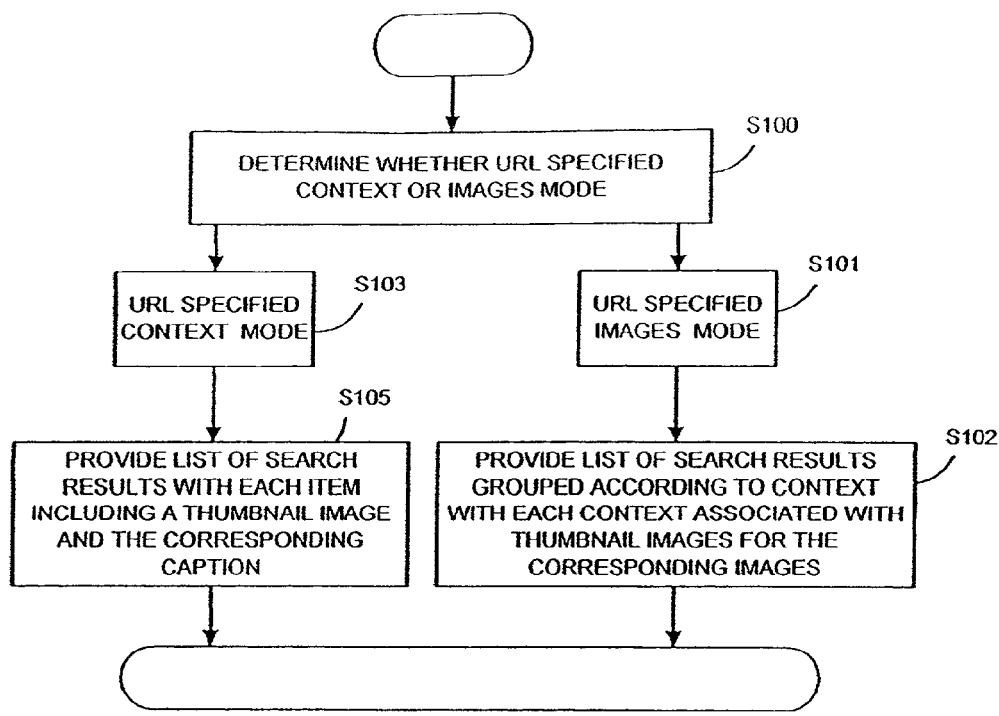
FIGS. 11a to 11c show flow charts for illustrating in greater detail steps carried out by the search interface apparatus upon receipt of search results from the search engine.

The search results provider 2*b* then processes the search results for supply to the user browser at step S10 in FIG. 7*b*. This process is shown in greater detail in FIG. 11.

Thus, at step S100, the search result provider 2*b* determines whether the URL containing the original search request specified presentation of the search results in the images or context mode.

When it is determined at step S101 that the images mode was selected, then, at step S102, the search results provider 2*b* generates an HTML document for providing a web page incorporating, for each search result, the corresponding thumbnail image provided by the database 4 and the corresponding caption.

If, however, the search results provider 2*b* determines that the URL specified the context mode at step S103, then the search results provider 2*b* generates, at step S105, an HTML document representing a web page in which the search results are grouped according to context and each context item is associated with thumbnail images provided by the database 4 for the stored images whose captions include that context item.

The search results are then forwarded to the user browser 1 which, as set out in FIG. 8, receives the HTML web page and displays the received page to the user at step S13.

Figure 13:
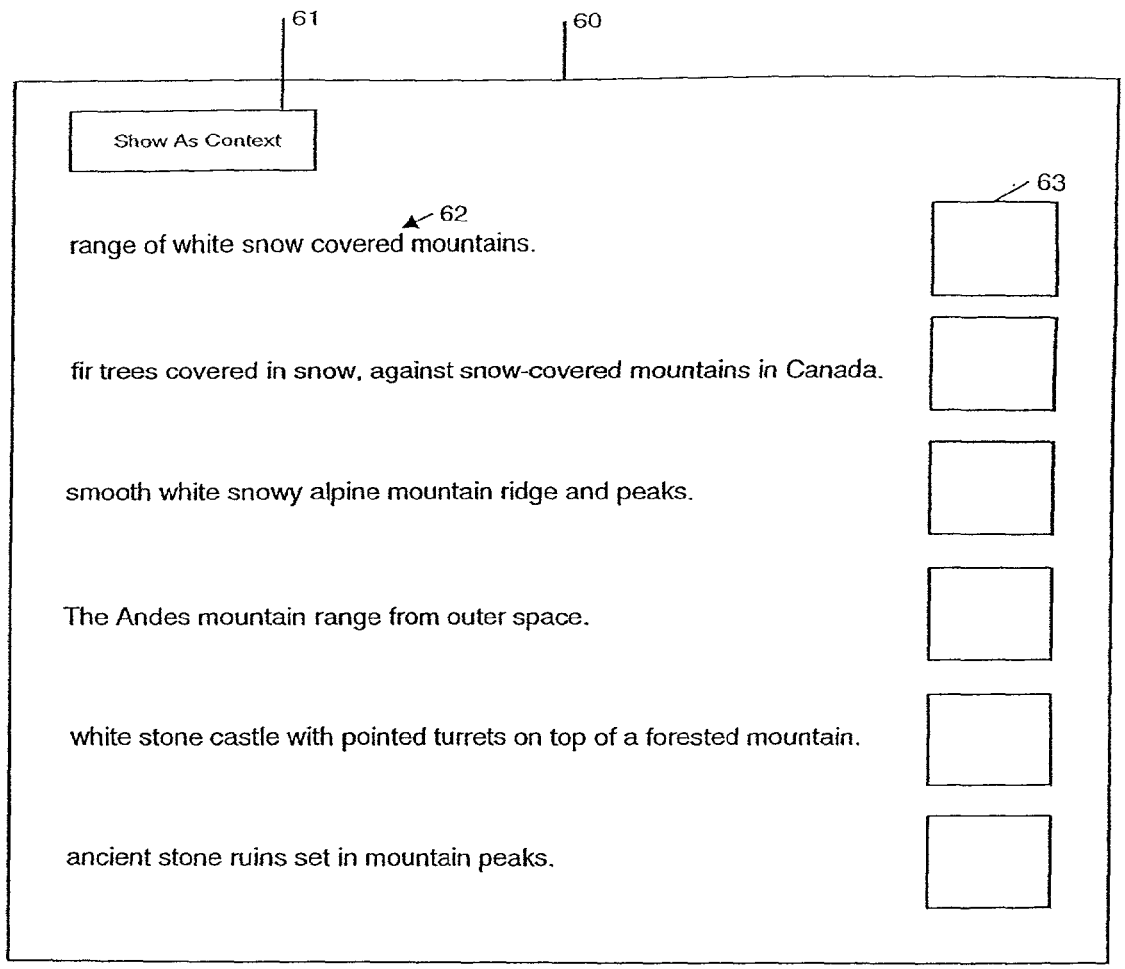
FIG. 13 shows an example of a screen that may be displayed to a user showing the results of a search in an image mode.

FIG. 13 shows an example of a web page of screen 60 displayed to the user where the user selected presentation of the search result in the images mode. As can be seen from FIG. 13, the screen 60 includes a set of seven search items each of which consists of a thumbnail image 63 and an associated caption 62. It will, of course, be appreciated that these are only examples and that many more or different search items may be retrieved depending upon the content of the database. Also, for the sake of simplicity, the thumbnail images 63 are shown blank in FIG. 13.

FIG. 13 also includes a button "show as context" 61 which enables the user to be presented with the search results sorted by context. If the user clicks on the "show as context" button 61, then the browser 1 will resubmit the search query to the web server 2 over the network N with a modified URL specifying the same search query but specifying that the context presentation mode is required as described above with reference to step S44 in FIG. 10*a*.

Where the button 61 in FIG. 13 is clicked or the user initially selected the context mode, then, as explained above, the search results provider 2*b* will group the search results in accordance with the determined context items and supply an HTML document or web page over the network N to the user browser 1.

Figure 14:
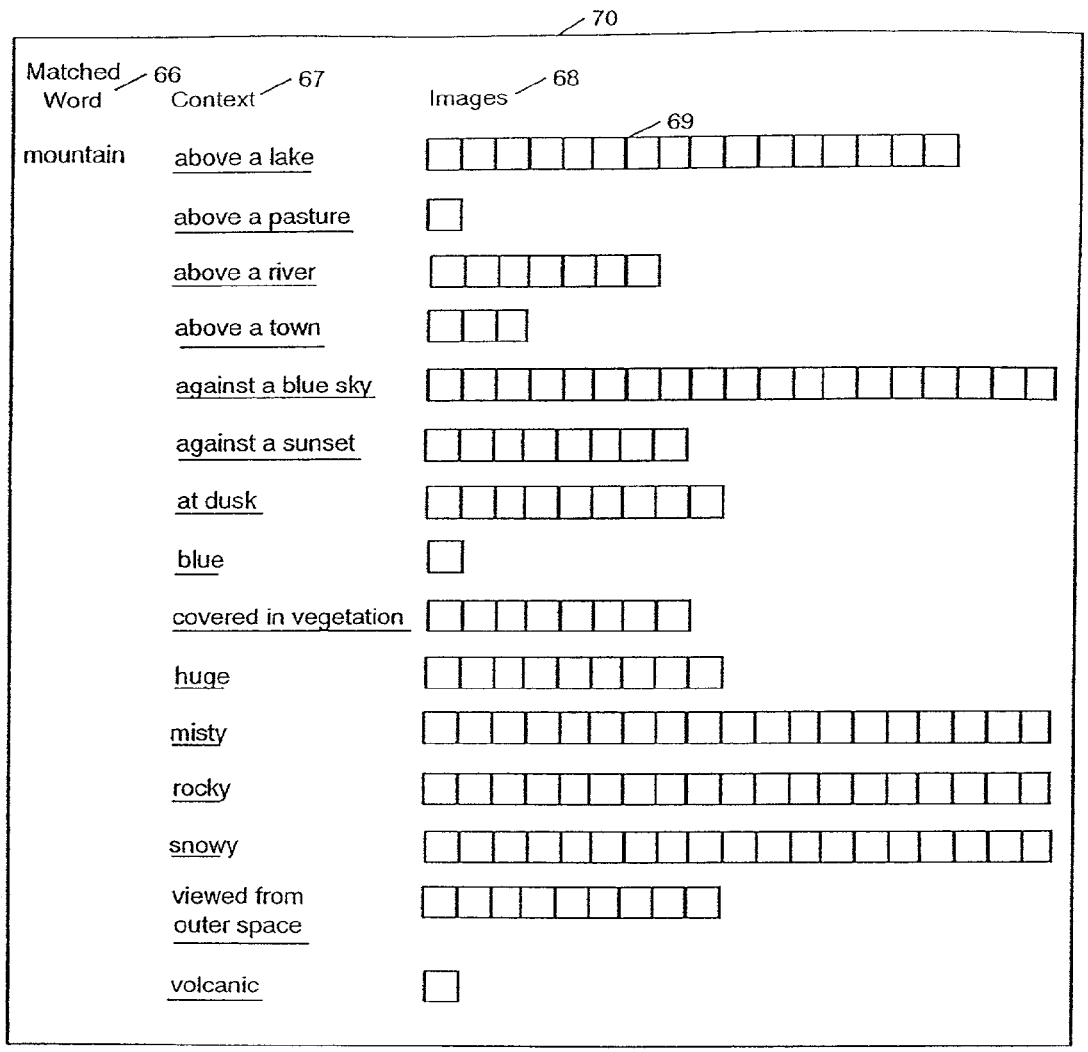
FIG. 14 shows an example of a screen that may be displayed to a user to show the results of a search in a context mode.

FIG. 14 shows an example of a screen 70 that may be displayed to a user. Again, it will be appreciated that the actual content of the screen will depend upon the content of the database 4. The screen 70 provides three columns 66, 67 and 68 headed "matched word", "context" and "images" respectively. The search query entered in the window 51 by the user is given as the matched word and the context items representing the contexts extracted by the context generation engine are listed in the column headed "context". Each context item is associated with one or more thumbnail images 69. Thus, for example, the context item "above a lake" is associated with a large number of thumbnail images each of which has a caption which includes a semantic match for the word "mountain" and also includes the context item "above a lake". It will, of course, be appreciated that, because the thumbnail images are grouped according to context, the same image may occur for one or more context items, so that, for example, an image whose caption reads "snowy mountains above a lake against a blue sky" would occur against the context item "above a lake", the context item "against a blue sky" and the context item "snowy".

The searching, context extraction and presentation of the search results to the user as so far described is similar to that described in EP-A-1033662. However, in accordance with the present invention, when presented in the context mode of presentation, the search results do not simply present the context item or items for the associated images. Rather, each context item represents a hyperlink as represented by the underlining in FIG. 14. Thus in accordance with the present invention, when step S102 is carried out, the search results provider 2b determines whether, for any image, a context item is associated with further context items, that is the caption for at least one image having that context item also has at least one other context item. This is shown in FIG. 11c.

Figure 11B:
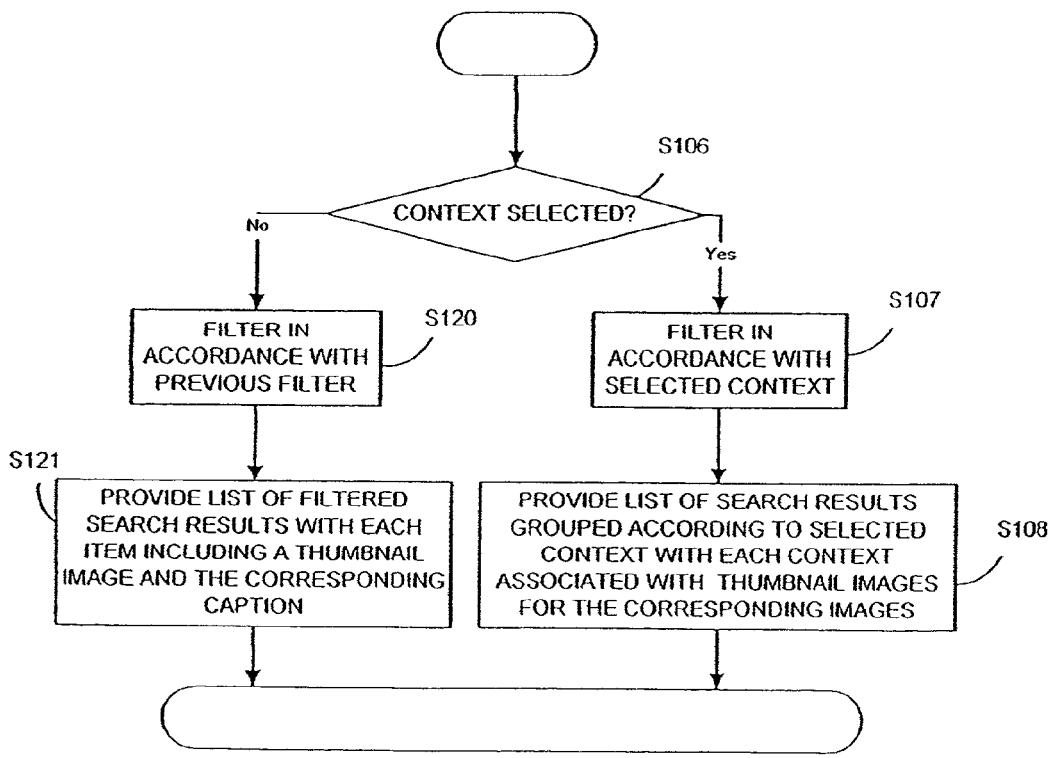
Figure 11C:
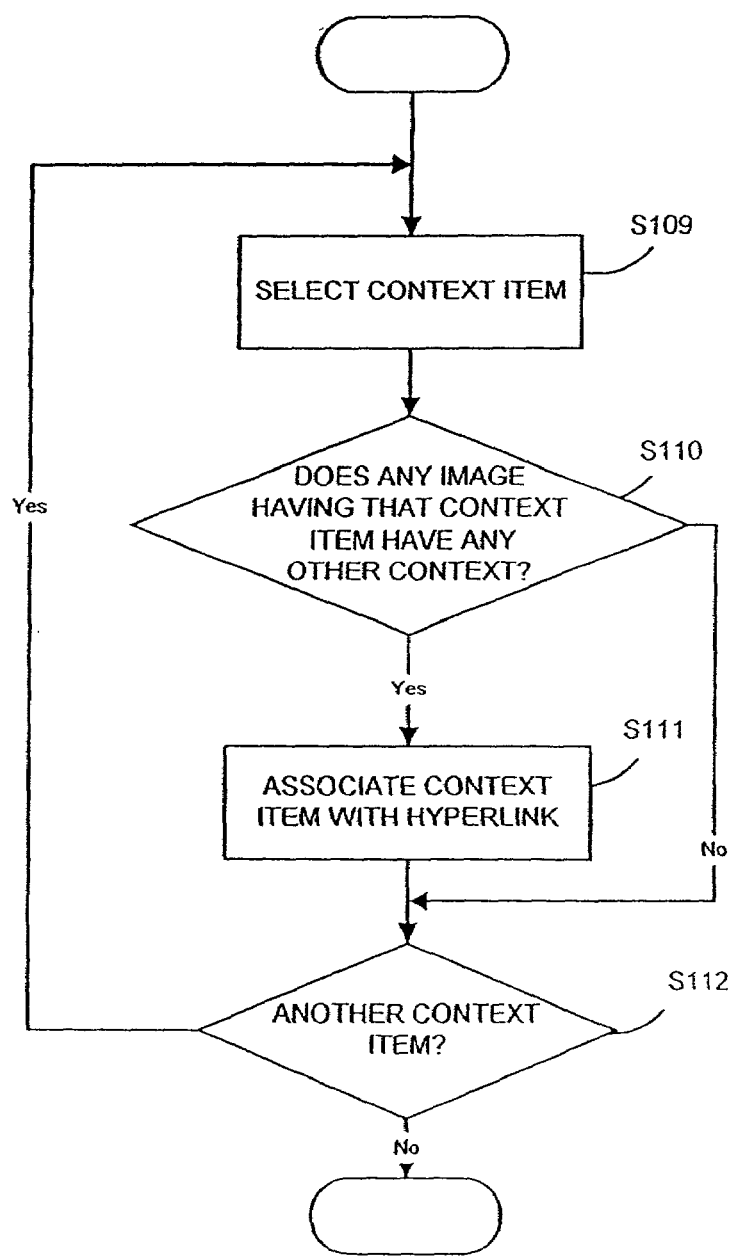

Thus at step S109 in FIG. 11c the search results provider 2b selects a first context item and determines at step S110 whether any image having that context item also is associated with another context item. If the answer is yes then the search results provider 2b associates a hyperlink with that context item at step S111.

The search results provider 2b then checks at step S112 whether there are any other context items to be checked and repeats steps S109 to S112 until the answer at step S112 is no. Thus each context item that is associated with at least one image having further context is associated with a corresponding hyperlink which is included by the search results provider 2b in the HTML document generated at step S102 in FIG. 11a. When the user receives on the display of his user browser the search results presented in context mode, the user may, as will be described below, further refine his search by selecting a particular context item to activate the corresponding hyperlink.

Figure 10B:
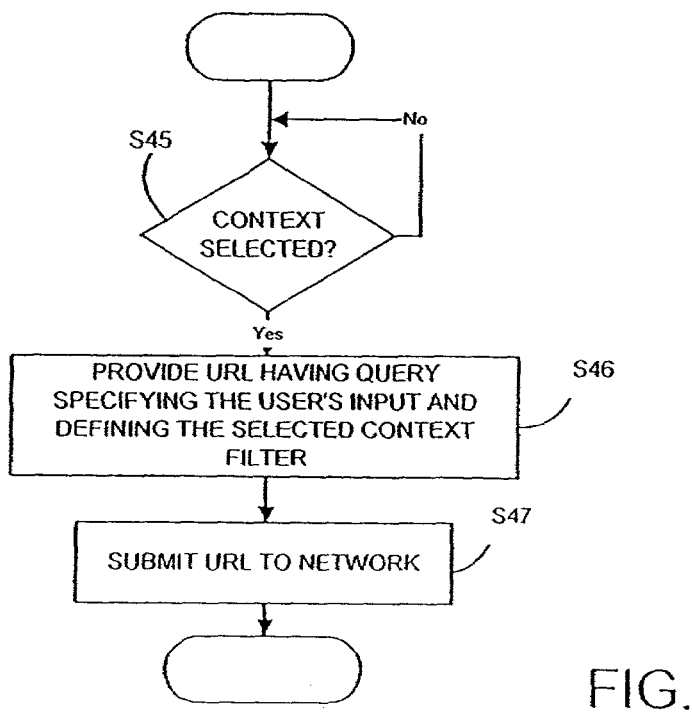

As set out in FIG. 10b, when the browser 1 determines at step S45 that a context item has been selected, then at step S46 the browser 1 generates a URL in accordance with the hyperlink associated with the context item. This URL is based on the URL generated for the original search request but modified to include a third key "select" which specifies a context filter specifying the context item selected by the user. Where, for example, the context item selected by the user is "against a blue sky" in FIG. 14 then the URL will have the form:

http://xxxx.com?rtype=context&query=
mountains&select=mountains%3a%3aagainst+a+
blue+sky&type=context where %3a represents a colon.

This URL is submitted to the network N at step S47 in FIG. 10b. Upon receipt of the URL at step S6 in FIG. 7a, the query generator 2a generates, using the CGI script, an XML document representing the search request for submission to the search engine 3. In this embodiment, this search request has the same format as described above, namely:

<ce>
<q>mountains </q>
</ce>

Upon receipt of the search request, the search engine 3 carries out the search again as described above, and returns the search results to the search results provider 2b.

The action of the search results provider 2b on receipt of the search results will now be described with reference to FIG. 11b.

Upon receipt of the search results, the search results provider 2b determines at step S106 in FIG. 11b that the URL for the search specified a selected context item. The search results provider 2b, then at step S107, filters the search results in accordance with the selected context item and retains only the search results whose context data includes the selected context item. Then at step S108, the search results provider 2b groups the filtered search results according to the context and incorporates the filtered search results including, again, the context items and hyperlink information into a HTML document forming a web page. The filtering process carried out by the search results provider 2b at step S107 is, in this embodiment, a simply keyword matching process so that only those images associated with context data exactly matching the selected context item will be retained.

The web page containing the filtered search results is then forwarded to the user browser 1 and the results are again displayed to the user.

FIG. 15 shows a screen 80 representing an example of the filtered search results obtained for the selected context "against a blue sky". The format is the same as that shown in FIG. 14 with the search results being presented with three column headings "matched word", "context" and "images" 66, 67 and 68, respectively.

As shown in FIG. 15, each of the context items listed represents a hyperlink indicating that further filtering is possible. The user may, therefore, choose to further refine his search by clicking on one of the context items set out in FIG. 15. If, for example, the user selects the context "snowy" then the browser 1 will be caused to generate a new URL which incorporates a further filter "snowy" as shown below:

http://xxxx.com?rtype=context&query=
mountains&select=mountains%3a%3aagainst+a+
blue+sky%3a,%3asnowy&type=context The process described above is then repeated with the search requests submitted to the search engine again being:

<ce>
<q> mountains </q>
</ce>

However, in this case, the filter applied by the search results provider 2b at step S107 is FIG. 11b is a matching filter which selects only those images whose captions include the context item "against a blue sky" and the context item "snowy". These further filtered search results are then incorporated into an HTML document together with the associated context items and any hyperlink information at step S108 as described above and forwarded to the user browser 1 to cause the browser to display the further filtered search results to the user. FIG. 16 shows a typical screen 90 that may be displayed by the browser. As can be seen, the search results are presented in a manner similar to that shown in FIGS. 14 and 15, with those context items that are linked to hyperlinks indicating that they have further context being shown underlined. In the example shown in FIG. 16 only two of the context items "above a lake" and "with trees" are associated with further context and so have a hyperlink.

The user may, if desired, then repeat the above process by selecting one of the hyperlinked context items, for example, the context item "with trees". The above described process will then be repeated with, in this example, the filter applied at step S107 filtering out only those images whose captions include the context items "against a blue sky", "snowy" and "with trees". FIG. 17 shows a screen 95 provided to the user with the results of this further filter of the search. In this example, a single image having the caption "snowy mountains with trees against a blue sky and above a lake" (that is a caption including a word providing a semantic match to the word "mountain" and including the context items "against a blue sky", "snowy" and "with trees") has been found. The context "above a lake" is not associated with a hyperlink because the image does not have further context associated with it.

Where a hyperlink for a context item is associated with only a single image then the filtered search results will simply be that image and the search results provider 2b may be configured to provide to the user the full image rather than the thumbnail image.

Each of the screens shown in FIGS. 15 to 17 provides the user with information indicating the applied filter, the number of located images and the number of images that have further context. In addition each of these screens includes a button 83 "show as images". Clicking on this button causes the browser 1 to supply to the web server 2 a URL based on the URL used to produce the filter search but with the type "context" replaced by the type "image". In this case when search results are received by the search results provider 2b, the search results provider 2b will determine at step S106 in FIG. 11b that image mode presentation has been selected. Then at step S120, the search results provider 2b filters the search results in accordance with the previously defined filter. Thus, for example, if the "show as images" button 83 is clicked in screen 90 shown in FIG. 16, then the search results will be filtered to pick out only those images whose captions include the context items "against a blue sky" and "snowy". Then at step S121, the search results provider 2b generates an HTML document including the thumbnail image for each image and its associated caption. This document will produce, when supplied to the user browser 1, a screen similar to the screen shown in FIG. 13 but including only those images having captions including all the context items present in the filter, that is, in this case, only those images with captions including the context item "against a blue sky".

In each of the screens shown in FIGS. 13 to 17, a user may also click on an individual thumbnail image. Clicking on a thumbnail image causes the browser 1 to generate a URL address including the image ID of that particular image to enable the image rather than the thumbnail image to be retrieved from the database 4. For example, if an image 69 shown in FIG. 17 is clicked on, then the URL will have the form set out below:

--- http://xxxx.com?rtype=context&query=
mountains&type=showimage&image=12/img0034.jp
g&caption=snowy+mountains+against+a+blue+sky+
and+above+a+lake

--- where 12/img0034.jpg is the image ID.

When this URL is received by the query generator 2a the query generator will generate a query to the database to enable the actual image rather than the thumbnail to be retrieved from the database 4 and supplied in an HTML document to the user via the network N.

In the above described embodiments, the database to be search consists of a database of images each associated with a caption. It will, of course, be appreciated that the search documents need not necessarily comprise images but could be for example, text documents, audio or video files or a combination of these. Where the search documents are text documents, then the meta data corresponding to the caption data may constitute an abstract for the document whereas, where the search documents are audio or video files, the meta data will again be caption data describing the video or audio file. Of course, the meta data may, for example, be derived by a speech recognition engine from a speech data file. Thus, for example, where the search documents are audio or video files, the meta data may be derived by the speech recognition engine from the audio data of the audio file or the sound track data of the video file. This enables, in the case of a video file, searching to be conducted on the basis of speech or voice data associated with the moving images or frames of the video data file enabling a user to search for a particular series of frames or frame within the sequence of moving images forming the video data of the video file.

The above described embodiments rely on natural language techniques to extract the context information from the meta data or captions. The present invention may, however, be applied where it is not necessary to extract the context information because the context information is already presented in a context table. This may be the case for any type of database, for example, an images audio files or video files database. An example of a database where this may be the case is a film database where the reference data for each film consists of the film title and the context data consists of subsidiary information available in the database for each film, such as, for example, the year of release, type of movie (Type) male lead (ML), male support (MS), female lead (FL), female support (FS), director (D), producer (P), writer (W), distributor (Dist), country (place), language (Lang) etc.

As an example, a user may search a film database for films whose titles include the word "escape". In this example, the radio button 53 in FIG. 12 would be labelled "lists" or "search items" rather than "images" and the search may, dependent upon the content of the database, result in a list such as the following:
 Great Escape, The
 Escape by Night
 Escape by Night
 Escape Clause
 Escape Dangerous
 Escape Velocity Escape from Alcatrax
Escape from Andersonville, The
Escape from Angola
Escape from Black Street
Escape from Crime
Escape from Cuba
Escape from Devil's Island
Escape from Dino Island
Escape from DS-3
Escape from East Berlin
Escape from El Diablo
Escape from Fort Bravo
Escape from Hell Island
Escape from Hong Kong
Escape from Japan
Escape from L.A.
Escape from New York
Escape from Paradise
Escape from Red Rock
Escape from Terror
Escape from the Planet of the Apes
Escape in the Desert
Escape in the Fog
Escape in the Sun
Escape Me Never
Narrow Escape, The Selecting "show results as context" in FIG. 12 would, provide the user with search results in the form shown in Table 1 below.

TABLE 1

| Matched Word | Context | Number of Films |
|---|---|---|
| Escape | 20th Century Fox (Dist) | ****** |
|  | 60's | ** |
|  | 70's | ** |
|  | 80's | **** |
|  | 90's | ****** |
|  | Action (Type) | ** |
|  | Clint Eastwood (ML) | *** |
|  | Comedy (Type) | * |
|  | English (Lang) | ****************** |
|  | Ernest Borgnine (MS) | * |
|  | French (Lang) | ** |
|  | Japanese (Lang) | * |
|  | John Carpenter (D) | *** |
|  | John Sturges (D) | * |
|  | Julia Roberts (FL) | ** |
|  | Kim Hunter (FS) | * |
|  | Kurt Russel (ML) | * |
|  | MGM (Dist) | ***** |
|  | Paramount (Dist) | ***** |
|  | Paul Dehn (W) | * |
|  | Roddy McDowall (MS) | * |
|  | Steve McQueen (ML) | ** |
|  | War (Type) | **** |
|  | Western (Type) | ** |

Where each context item in the context column, is a hyperlink, that when activated, would cause the search results to be filtered in accordance with that context. Thus, for example, if the user clicks on the hyperlink "Steve McQueen" in Table 1, then the search results presented to the user may have the form shown in Table 2 below.

TABLE 2

| Matched Word | Context | Number of Films |
|---|---|---|
| Escape | 20th Century Fox (Dist) | ****** |
|  | 60's | ** |
|  | 70's | ** |
|  | Action (Type) | ** |
|  | Clint Eastwood (ML) | *** |
|  | English (Lang) | ****************** |
|  | Ernest Borgnine (MS) | * |
|  | John Sturges (D) | * |
|  | MGM (Dist) | ***** |
|  | Paramount (Dist) | ***** |
|  | War (Type) | **** |
|  | Western (Type) | ** |

Where the number of films is greater than one, then the context item will then again represent a hyperlink and selecting that hyperlink will cause the search results to be filtered in accordance with that context item. Thus, for example, selecting John Sturges as the director will result in the user being presented with search results including only one film namely

| "The Great Escape" | |
|---|---|
| (ML): | Steve McQueen |
| (D): | John Sturges |
| (Type): | War |
| (Lang): | English . . . |

Handling of dates may need special attention because listing each year separately may clutter the users display while decade a grouping of years does not allow more specific filtering when only a few films remain in the filtered search results. This may be handled by defining individual decades as individual context items each of which has subsidiary context items so that selecting a decade will break that decade up into smaller year groupings.

In the above described embodiments, the search interface apparatus or web server 2 and search engine 3 are provided by a single computer system. These may, however, be provided by separate computer systems that may be directly coupled or coupled via the network N or a different network. Also, in the above described embodiments, the database 4 is directly connected to the search engine 3. It may, however, be possible for the database 4 to be physically located elsewhere on the network N or on a different network.

In the above described embodiments, the user browser 1 is coupled to the search interface apparatus 2 via a network N. It is, however, possible for the search interface apparatus 2 to be provided at the user browser 1 and for the connection to the search engine 3 to be via a network. In addition, a single computer system may be provided which provides the user browser, the search interface apparatus 2 and the search engine 3 and possibly also the database 4, in which case the network N will be omitted.

In the above described embodiments, searching according to context is carried out by the search results provider 2b. However, the query generator 2a may be configured so as to construct the search query for the search engine 3 so that the search request presented to the search engine 3 includes the filter causing the search engine 3 to return only those documents which pass the filter.

In the above described embodiments, the search results are not saved by the search interface apparatus 2 and accordingly each time the user selects a context item in any of FIGS. 14 to 17 above or selects "show as images" in FIGS. 15 to 17 above, a fresh search request is generated. It may, however, be possible (particularly where the search interface apparatus 2 is provided at the user browser 1) for the results of the previous search to be stored so that it is not necessary for the search to be repeated, rather the context filter may be applied to the stored results of the previous search.

In the above described embodiments, hyperlinks are used to initiate context filtering. This need not necessarily be the case and, for example, clicking or double clicking on the context may activate a sub-program or application which causes the required action to be carried out.

In the above described embodiments, the search results are presented as a list. However, drop down menus may be used so that, for example, clicking on the word "context" would present a drop down list of context items from which the user could then select.

In the above described embodiments, the browser has a graphical user interface. It may, however, be possible to apply the present invention where the browser enables the user to input search instructions verbally.

The invention claimed is:

1. Apparatus for presenting search results to a user to facilitate refinement of the search, the apparatus comprising:
   a receiver operable to receive from a search engine results of a search in a database on the basis of a search criterion,
   wherein the database comprises search items each stored in association with one or more context items describing different aspects of that search item, and
   wherein the search results consist of a set of the search items selected in accordance with the search criterion and grouped by context item so that the search items are presented as a plurality of groups of search items with all search items in a group being associated with the same context item such that each search item that is associated with a plurality of context items is in a corresponding plurality of groups, and with each group having a group label representing the group context item;
   a modifier operable to produce modified search results by:
   i) determining, for each of the groups, whether any of the search items in that group is also associated with at least one other of the context items in addition to the group context item;
   ii) associating the group label of any group that includes search items determined to be associated with at least one other of the context items in addition to the group context item with data enabling the user to cause the search results to be filtered in accordance with the group context item by selecting the group label;
   iii) producing, in response to selection of one of the group labels by the user, a sub-set of search items consisting of those of the set of search items that are associated with the context item represented by the selected group label,
   wherein the search items of the sub-set of search items are grouped by context item into a sub-set of the plurality of groups which sub-set excludes the group represented by the selected group label; and
   iv) determining, for each of the sub-set of groups, whether any of the search items in that group is also associated with at least one other of the context items in addition to the group context item and in addition to the context item represented by the selected group label, and associating the group label of any such one of the sub-set of groups with data enabling the user to cause the modified search results to be further filtered in accordance with that context item by selecting that group label; and
   a supplier operable to supply the modified search results to the user.

2. Apparatus according to claim 1, further comprising:
   a search receiver operable to receive search instructions from a users; and
   a search instructor operable to instruct the search engine to carry out a search in accordance with the received search instructions,
   wherein, in the case that the user selects a group label, the search instructor instructs the search engine to carry out a further search in accordance with refined search instructions consisting of the received search instructions and the selected context item.

3. Apparatus according to claim 1, further comprising:
   a search receiver operable to receive search instructions from a user; and
   a search instructor operable to instruct the search engine to carry out a search in accordance with the received search instructions,
   wherein, in the case that the user selects a group label, the search instructor instructs the search engine to carry out a further search in accordance with the received search instructions, and wherein a filter is operable to filter the further search results in accordance with the selected context item.

* * * * *

UNITED STATES PATENT AND TRADEMARK OFFICE
CERTIFICATE OF CORRECTION

PATENT NO. : 7,165,080 B2  
APPLICATION NO. : 09/984088  
DATED : January 16, 2007  
INVENTOR(S) : Kotcheff et al.

Page 1 of 1

It is certified that error appears in the above-identified patent and that said Letters Patent is hereby corrected as shown below:

<u>COLUMN 16</u>:  
Line 28, "users;" should read -- user; --.

Signed and Sealed this

Eighth Day of April, 2008

JON W. DUDAS  
*Director of the United States Patent and Trademark Office*